(12) United States Patent
Mori et al.

(10) Patent No.: US 7,197,037 B2
(45) Date of Patent: Mar. 27, 2007

(54) DEVICE AND SYSTEM FOR MESSAGE PROCESSING

(75) Inventors: Daishi Mori, Yokohama (JP); Yoko Fukushima, Tokorozawa (JP); Masana Minami, Koganei (JP); Naoya Mitsuhashi, Hadano (JP)

(73) Assignee: Alpine Electronics, Inc., Tokyo (JP)

( * ) Notice: Subject to any disclaimer, the term of this patent is extended or adjusted under 35 U.S.C. 154(b) by 16 days.

(21) Appl. No.: 10/691,475

(22) Filed: Oct. 22, 2003

(65) Prior Publication Data

US 2004/0136355 A1 Jul. 15, 2004

(30) Foreign Application Priority Data

Oct. 25, 2002 (JP) .............................. 2002-310405

(51) Int. Cl.
*H04L 12/28* (2006.01)

(52) U.S. Cl. ....................................... 370/392; 455/500

(58) Field of Classification Search ................ 370/254, 370/255, 400, 338, 236, 238; 701/29, 213; 455/500

See application file for complete search history.

(56) References Cited

U.S. PATENT DOCUMENTS

| | | | |
|---|---|---|---|
| 3,756,456 A | 9/1973 | Georgi | |
| 4,823,373 A | 4/1989 | Takahaski et al. | |
| 5,056,036 A | 10/1991 | Van Bork | |
| 6,046,978 A * | 4/2000 | Melnik | 370/221 |
| 6,130,881 A * | 10/2000 | Stiller et al. | 370/238 |
| 6,208,870 B1 * | 3/2001 | Lorello et al. | 455/466 |
| 6,292,743 B1 * | 9/2001 | Pu et al. | 701/202 |
| 6,304,556 B1 * | 10/2001 | Haas | 370/254 |
| 6,310,858 B1 * | 10/2001 | Kano et al. | 370/235 |
| 6,333,979 B1 * | 12/2001 | Bondi et al. | 379/219 |
| 6,338,087 B1 * | 1/2002 | Okanoue | 709/222 |
| 6,363,320 B1 * | 3/2002 | Chou | 701/207 |
| 6,438,695 B1 * | 8/2002 | Maufer | 726/11 |
| 6,539,217 B1 * | 3/2003 | Syed et al. | 455/406 |
| 6,549,625 B1 * | 4/2003 | Rautila et al. | 380/258 |
| 6,553,218 B1 * | 4/2003 | Boesjes | 455/406 |
| 6,580,981 B1 * | 6/2003 | Masood et al. | 701/29 |
| 6,636,158 B1 * | 10/2003 | Bando et al. | 340/825.49 |

(Continued)

FOREIGN PATENT DOCUMENTS

EP 0867202 9/1998

*Primary Examiner*—Doris H. To
*Assistant Examiner*—Steve Blount
(74) *Attorney, Agent, or Firm*—Brinks Hofer Gilson & Lione

(57) ABSTRACT

In a message processing system, a plurality of vehicles or other locations are equipped with message processing devices and transmit and receive a message. The message has a header and a body. The header includes a valid duration and/or a valid zone specified by various methods, and an optional flag set when the message reaches the valid zone. The body includes data to be transmitted and read out for predetermined processing. When receiving the message, the message processing device may transfer the message if the message is within the valid duration and the device is within the valid zone, or if the message is within the duration and the device is not within the valid zone but the flag is not set. When transmitting a message, the message processing device sets the valid duration and/or zone and may include the flag for the message header, and generates the data to be transmitted for the message body.

15 Claims, 11 Drawing Sheets

U.S. PATENT DOCUMENTS

| | | | |
|---|---|---|---|
| 6,643,511 B1 * | 11/2003 | Rune et al. | 455/433 |
| 6,728,545 B1 * | 4/2004 | Belcea | 455/456.2 |
| 6,807,270 B2 * | 10/2004 | Porter | 379/220.01 |
| 6,810,045 B1 * | 10/2004 | Brune et al. | 370/498 |
| 6,816,460 B1 * | 11/2004 | Ahmed et al. | 370/238 |
| 6,839,542 B2 * | 1/2005 | Sibecas et al. | 455/41.2 |
| 6,876,670 B1 * | 4/2005 | Budrikis et al. | 370/474 |
| 6,940,832 B2 * | 9/2005 | Saadawi et al. | 370/328 |
| 6,947,384 B2 * | 9/2005 | Bare | 370/235 |
| 6,985,476 B1 * | 1/2006 | Elliott et al. | 370/349 |
| 6,990,075 B2 * | 1/2006 | Krishnamurthy et al. | 370/236 |
| 7,006,453 B1 * | 2/2006 | Ahmed et al. | 370/255 |
| 2001/0021654 A1 * | 9/2001 | Spratt et al. | 455/500 |

* cited by examiner

FIG. 2

| HEADER | ZONE OF INFORMATION TRAP LINE |
| | DURATION OF MAINTAINING INFORMATION TRAP LINE (VALID DURATION) |
| | FLAG INDICATING WHETHER INFORMATION TRAP LINE HAS BEEN FORMED OR NOT |
| BODY | DATA SPECIFIC TO APPLICATIONS |

DEVICE AND SYSTEM FOR MESSAGE PROCESSING

BACKGROUND OF THE INVENTION

1. Field of the Invention

The present invention relates to a device and a system for message processing for transferring messages among vehicles.

2. Description of the Related Art

Common networks such as the Internet need server equipment for administering formation, retention, and destruction of communication channels, as well as for relaying and temporarily storing data. However, in the case where information is obtained from a vehicle passing through a certain zone, and information is conveyed to a vehicle passing through a certain zone, the information is not always useful for the drivers in the vehicles. Therefore, asking the drivers to bear the communication costs and costs for network operation and maintenance is sometimes difficult.

A method for creating a message including a vehicle position next to a header is recognized as a known technology for easily transmitting and receiving messages between vehicles. With regard to this technology, Japanese Unexamined Patent Application No. 2002-190093 is incorporated herein by reference. A message including position data of a vehicle transmitting the message allows the location from which the message is transmitted to be identified. Thus, in the above case of obtaining information from a vehicle passing through a certain zone using this kind of message, the method has an advantage of allowing a receiving device to check whether or not the location from which the message is transmitted is within a certain zone.

In the above-mentioned Japanese Patent Application, the message is assumed to be received and transmitted between vehicles only. Thus, it is disadvantageous if dedicated equipment, such as a server for administering formation, retention, and destruction of communication channels, is required to transmit or receive a message between vehicles whose radio waves cannot reach one another. Especially, if the message is transmitted or received between vehicles whose radio waves cannot reach one another without such a server, the message must be transferred through another vehicle between these vehicles. This has the drawback of remaining old messages.

SUMMARY OF THE INVENTION

The present invention was created in view of the above, and an object of the invention is to provide a device and a system for message processing that allow messages to be transmitted and received among vehicles without adding special equipment for administering formation, retention, and destruction of a network.

To solve the above-mentioned problems, the message processing device of this invention has message receiving means for receiving a message having a header including a valid duration and a body including data to be transmitted, duration determining means for determining whether or not a message is within a valid duration when the message is received by the message receiving means, and application processing means for reading out data included in the body to execute predetermined processing when a positive result is given by the duration determining means. Since the valid duration is included in the header of the message transferred, simply transmitting and receiving the message enables a network to be formed and retained within a valid duration and to be destroyed automatically when the valid duration is over, without installing special equipment, such as a server.

Also, the message processing device of the invention has message receiving means for receiving a message having a header including a valid duration and a body including data to be transmitted, zone determining means for determining whether or not the message processing device is located within a valid zone when receiving the message by the message receiving means, message transferring means for transferring the message when a positive result is given by the zone determining means, and application processing means for reading out data included in the body to execute predetermined processing when a positive result is given by the zone determining means. Since the header of the transferred message includes a valid zone, simply transmitting and receiving the message enables a network to be formed and retained in a specific area without installing special equipment, such as a server.

Preferably, the header including a valid duration further includes a valid zone and the message processing device has zone determining means for determining whether or not the device is within the valid zone when receiving a message by the message receiving means. The message transferring means transfers a message when a positive result is given by the duration determining means and the zone determining means. The application processing means reads out data included in the body to execute predetermined processing when a positive result is given by the duration determining means and the zone determining means. This allows a combination of a valid duration and a valid zone to administer formation, retention, and destruction of a network.

It is also preferable that the header including a valid duration include a valid zone and a flag which is set when a message reaches the valid zone and that the message processing device have zone determining means for determining whether or not the device is within the valid zone when receiving a message by the message receiving means. The message transferring means transfers the message when a positive result is given by the duration determining means and the zone determining means. Alternatively, it transfers the message when a positive result is given by the duration determining means, a negative result is given by the zone determining means, and a flag is not set. The application processing means reads out data included in the body to execute predetermined processing when a positive result is given by the duration determining means and the zone determining means. In this way, using a flag which is set when a message reaches the valid zone enables a message which has not reached the valid zone to be transferred without being cancelled. Also, a network is easily formed, retained, and destroyed in an area remote from the in-vehicle terminal which is a message source.

In addition, it is preferable that the message processing device have position detecting means for detecting the current location of the device and the zone determining means operate based on the detection result by the position detecting means. This allows an accurate determination of whether or not a message processing device receiving a message is located within the valid zone included in the message header even while the message processing device installed in a vehicle or the like is moving.

The message processing device of the invention has valid duration setting means for setting a valid duration, application processing means for generating data to be transmitted, and message transmitting means for transmitting a message having a header including the valid duration set by the valid duration setting means and a body including data generated by the application processing means. Since the header of the message transmitted includes a valid duration, simply transmitting and receiving the message enables a network to be formed and retained within the valid duration and to be destroyed automatically when the valid duration is over, without installing special equipment, such as a server.

Also, the message processing device of the invention has zone setting means for setting a valid zone, application processing means for generating data to be transmitted, and message transmitting means for transmitting a message having a header including the valid zone set by the zone setting means and a body including data generated by the application processing means. Since the header of the message transmitted includes a valid zone, simply transmitting and receiving the message enables a network to be formed and retained in a specified area without installing special equipment, such as a server.

Preferably, the message processing device also has the zone setting means for setting a valid zone, and the message transmitting means transfers a message having a header including a valid duration set by the valid duration setting means and a valid zone set by the valid zone setting means, and a body including data generated by the application processing means. This allows administration of formation, retention, and destruction of a network with a combination of the valid zone and the valid duration.

It is also preferable that the message processing device have the zone setting means, and the message transmitting means transmit a message having a header including a valid duration set by the valid duration setting means, a valid zone set by the zone setting means, and a flag set when the message reaches the valid zone, and a body including data generated by the application processing means. Using the flag set when the message reaches the valid zone enables a message which has not reached the valid zone to be transferred without being cancelled. Thus a network is easily formed, retained, and destroyed in an area remote from the in-vehicle terminal which is a message source.

The above mentioned zone setting means preferably sets a range between intersections along the road as a valid zone when a plurality of intersections is specified. Thereby, a part of the road is accurately set as a valid zone.

It is also preferable that the zone setting means set a range along the road specified by a road name as a valid zone when a road name is specified. Alternatively, when an administrative district name is specified, the geographical area specified by the administrative district name is preferably set as a valid zone. Thereby, a valid zone can be easily set simply by specifying a road name or an administrative district name.

When a plurality of points are specified, the zone setting means preferably sets a geographical area enclosing the points as a valid zone. Thereby, a valid zone of a specified area can be set easily.

In addition, it is preferable that the message processing device be equipped with a navigation device which displays maps and that the above mentioned zone setting means use map display screens displayed on the navigation device to set a valid zone. This allows setting of a valid zone simply by specifying points on the map images, thereby improving the operability and setting accuracy.

In the message processing system of the present invention a vehicle is equipped with the message processing device and a message is transmitted and received among a plurality of vehicles. Therefore, in the case of transferring or transmitting a message among vehicles, a network is formed, retained, and destroyed without installing special equipment.

As described above, since a header of a message transferred or transmitted includes a valid duration and a valid zone, simply transmitting and receiving the message enables a network to be formed, retained, and destroyed within the valid duration or the valid zone.

BRIEF DESCRIPTION OF THE DRAWINGS

FIG. 2 shows the structure of messages transmitted and received among vehicles in the inter-vehicle network system of the embodiment;

DESCRIPTION OF THE PREFERRED EMBODIMENTS

Figure 1:
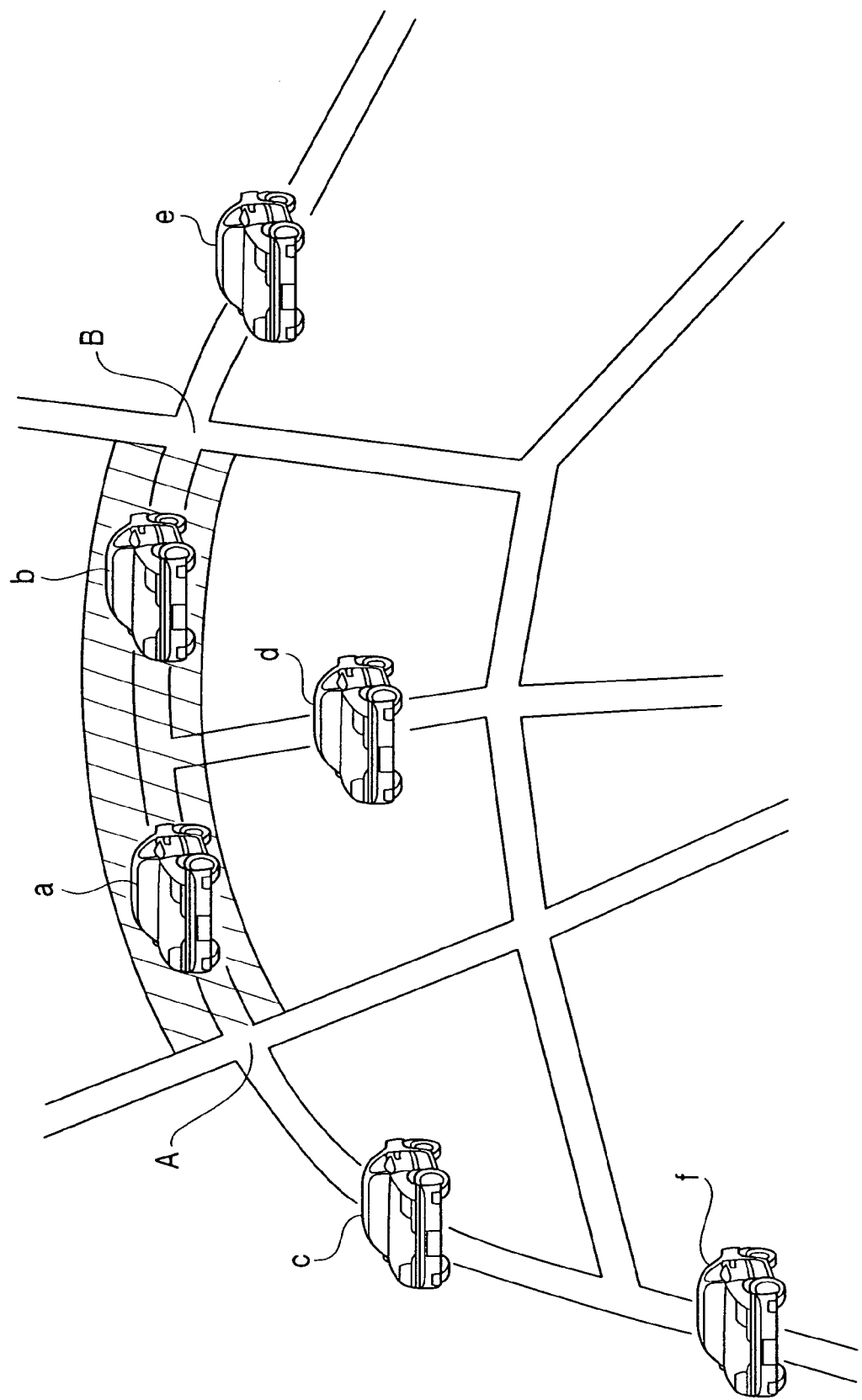
FIG. 1 is a schematic diagram showing the concept of an inter-vehicle network system according to an embodiment of the present invention.

Referring to the drawings, an inter-vehicle network system is described in detail as an embodiment of the present invention.

FIG. 1 shows the concept of an embodiment of the inter-vehicle network system. FIG. 2 shows the structure of messages sent and received between vehicles in the inter-vehicle network system of the embodiment.

The inter-vehicle network system of the embodiment is characterized by transmitting and receiving messages having the structure shown in FIG. 2 in inter-vehicle communications, thereby dynamically forming and retaining, and ultimately automatically destroying a dedicated network for collecting and providing information in any area specified by the messages. In this specification the dedicated network formed in this way is called the "Information Trap Line."

As shown in FIG. 2, a message transmitted and received in the inter-vehicle network system of the embodiment is divided into a header for collecting necessary information for forming, retaining, and destroying the Information Trap Line, and a body including specific data translated and processed by respective applications.

The header includes the following three items of information:

(1) A zone forming the Information Trap Line (valid zone). In FIG. 1 the Information Trap Line is set along the road between intersections A and B (the hatched region). Methods for specifying a zone vary. As alternative methods other than setting the zone along with each road segment as shown in FIG. 1, longitude and latitude may be specified independently of a road to set a range, or an administrative district may be specified. Examples of specifying a zone of the Information Trap Line are described later.

(2) Duration of retaining the Information Trap Line (valid duration). A valid duration for the message is set. Other than specifying a final date and time for the valid duration, specifying both a starting and expiration date and time or message transfer times are also possible.

(3) A flag indicating whether or not the Information Trap Line has been formed. The flag indicates a message relay and is initially False (unset state). Usage of the flag is described later.

In FIG. 1, a plurality of vehicles a to f are driving at various points on the roads. An in-vehicle terminal (described later) installed in each vehicle receives a message transmitted from an in-vehicle terminal of another vehicle. If the message satisfies a specified discard condition, the in-vehicle terminal discards the message; otherwise, the in-vehicle terminal transmits the message to the in-vehicle terminals of other vehicles. In this way, the message is transmitted among in-vehicle terminals of the vehicles. If an in-vehicle terminal receives data instructing an operation included in the body, the instructed operation is executed.

Figure 3:
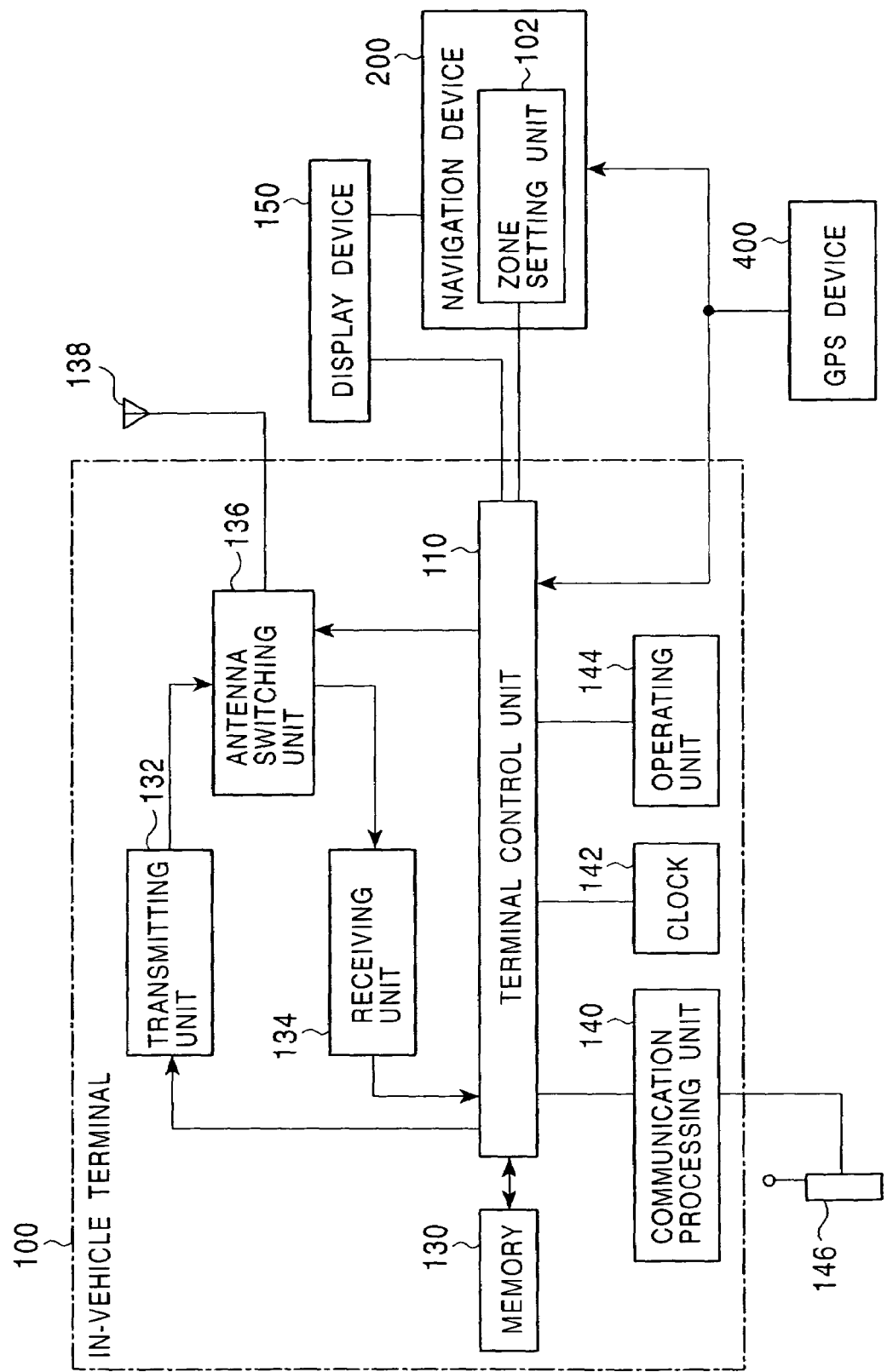
FIG. 3 is an overall block diagram of an in-vehicle terminal installed in each vehicle.

Next, the in-vehicle device installed in each vehicle is described in detail. FIG. 3 illustrates an overall configuration of the in-vehicle device.

The in-vehicle device of each vehicle includes an in-vehicle terminal 100, a display device 150, a navigation device 200, and a GPS receiver 400.

The in-vehicle terminal 100 works as a message processing device and wirelessly communicates with the in-vehicle terminals 100 installed in other vehicles to transmit and receive a message having the structure described in FIG. 2. Thus, the in-vehicle terminal 100 is composed of a terminal control unit 110, a memory 130, a transmitting unit 132, a receiving unit 134, an antenna switching unit 136, an antenna 138, a communication processing unit 140, a clock 142, and an operating unit 144.

The terminal control unit 110 executes a predetermined program stored in the memory 130 to control the overall operation of the in-vehicle terminal 100. The memory 130 stores the program executed by the terminal control unit 110, a unique ID assigned to the in-vehicle terminal 100, and information on the type and user of the vehicle equipped with the in-vehicle terminal 100.

The transmitting unit 132 transmits a transmit signal, received from the terminal control unit 110, via the antenna switching unit 136 from the antenna 138 to other vehicles. The receiving unit 134 receives an incoming signal transmitted from another vehicle and reaching the antenna 138, via the antenna switching unit 136. According to a transmit/receive switching signal received from the terminal control unit 110, the antenna switching unit 136 selectively connects the antenna 138 to the transmitting unit 132 or the receiving unit 134.

The communication processing unit 140 transmits predetermined information from the terminal control unit 110 from a mobile phone 146 externally connected to the in-vehicle terminal 100, and receives predetermined information with the mobile phone 146. The clock 142 measures the current time. The operating unit 144 is for a user to enter various instructions. A zone and valid duration for the Information Trap Line, which are included in the header of the message in FIG. 2, are set according to the instructions entered by the user to the operating unit 144.

The display device 150 is connected to the in-vehicle terminal 100 and the navigation device 200 and displays operation screens, setting screens, or map images from the navigation device 200.

The navigation device 200 navigates the vehicle by displaying map images in the vicinity of the running vehicle, searching for a route to a specified destination, and navigating the vehicle along the route. The navigation device 200 also sets a zone for the Information Trap Line using a map display function. The zone is set by a zone setting unit 202.

The navigation device 200 connects with a GPS device 400. The GPS device 400 has a GPS antenna and an operating part which analyzes satellite waves received by the GPS antenna, and generates the position of the vehicle in which the navigation device 200 is installed (longitude and latitude). The vehicle position information from the GPS device 400 is then transmitted to the in-vehicle terminal 100.

Figure 4:
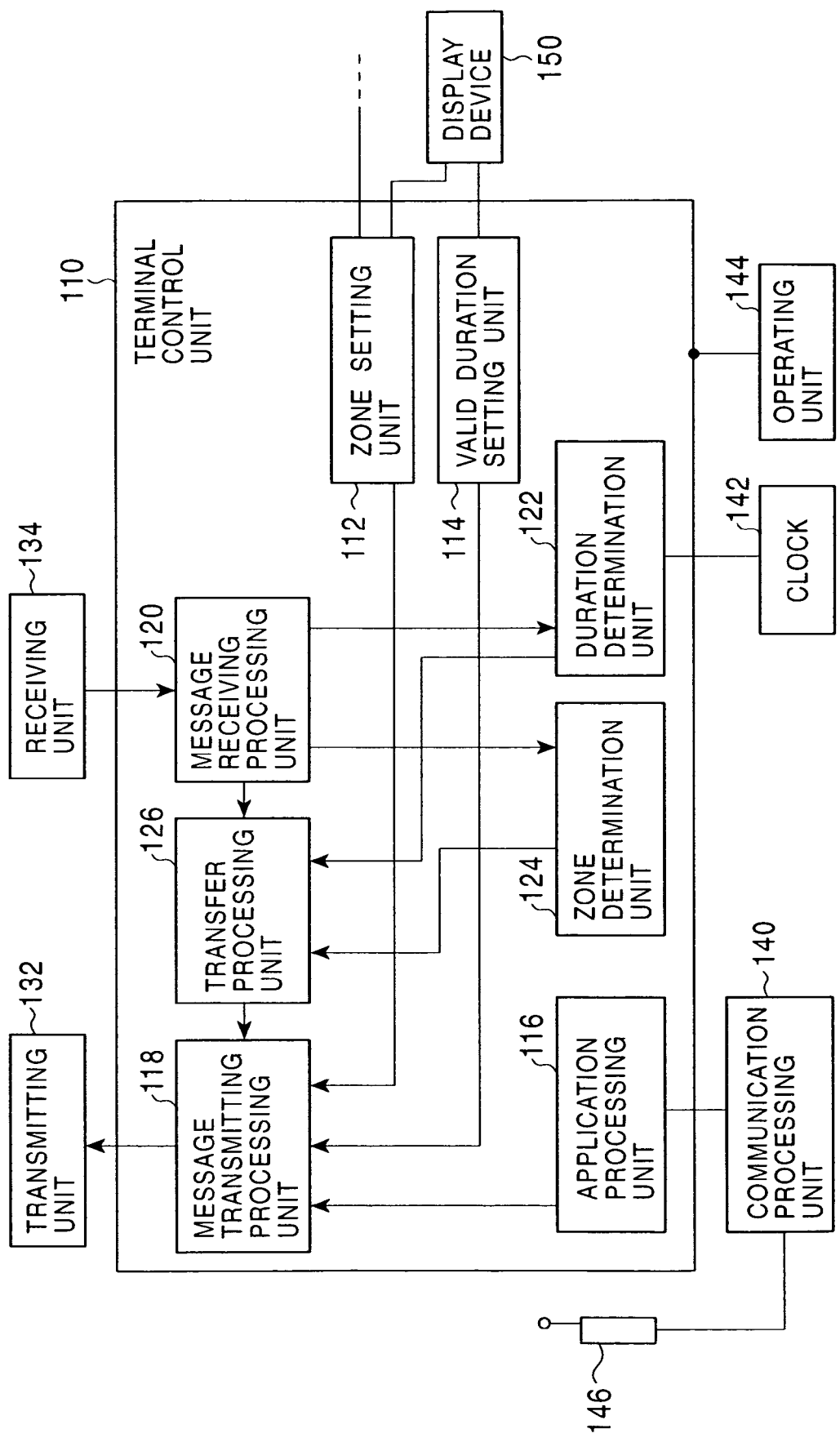
FIG. 4 is a functional block diagram showing a detailed configuration of a terminal control unit.

FIG. 4 is a functional block diagram illustrating a detailed structure of the terminal control unit 110. The terminal control unit 110 includes a zone setting unit 112, a valid duration setting unit 114, an application processing unit 116, a message transmitting processing unit 118, a message receiving processing unit 120, a duration determination unit 122, a zone determination unit 124, and a transfer processing unit 126.

If the in-vehicle terminal 100 is a message source, the zone setting unit 112 in the terminal sets a zone for the Information Trap Line in the header. As described above, the navigation device 200 also has the zone setting unit 202. To set a zone using the map display function of the navigation device 200, the zone setting unit 112 in the terminal control unit 110 requests setting by the zone setting unit 202 in the navigation device 200. If the in-vehicle terminal 100 is a message source, the valid duration setting unit 114 in the terminal sets a valid duration for the Information Trap Line in the header.

The application processing unit 116 executes processing of each application. If the in-vehicle terminal 100 is a message source, the application processing unit 116 in the terminal creates body data. If the in-vehicle terminal 100 is not a message source, the application processing unit 116 obtains body data and executes predetermined processing.

The message transmitting processing unit 118 executes processing for transmitting a message from the in-vehicle terminal 100 to the in-vehicle terminals 100 of other vehicles. The message produced from the message transmitting processing unit 118 is transmitted from the antenna 138 via the transmitting unit 132 and the antenna switching unit 136.

The message receiving processing unit 120 executes processing for receiving a message transmitted from an in-vehicle terminal 100 of another vehicle. The message is received via the antenna 138 and the antenna switching unit 136 by the receiving unit 134 to be provided to the message receiving processing unit 120.

The duration determination unit 122 extracts a valid duration for the Information Trap Line included in the header of a message received by the message receiving processing unit 120, and determines whether or not the current time supplied by the clock 142 is within the valid duration. The zone determination unit 124 extracts a zone for the Information Trap Line included in a header of the message received by the message receiving processing unit 120 to determine whether or not the current position of the vehicle equipped with this message processing device is within the zone. If the in-vehicle terminal 100 is not a message source, positive results given by the duration determination unit 122 and the zone determination unit 124 allow the above-mentioned application processing unit 116 to execute the predetermined processing based on the obtained body data. That is, when the message is both within the zone and the valid duration of the Information Trap Line, the application processing unit 116 executes the processing.

The transfer processing unit 126 discards a message received by the message receiving processing unit 120, and provides a message to the message transmitting processing unit 118 for transfer. For example, if the duration determination unit 122 determines that a message is out of the valid duration, the message is discarded. If the zone determination unit 124 determines that the vehicle equipped with this message processing device is out of the zone of the Information Trap Line and the flag included in the header is TRUE (in the set state), the message is discarded. Otherwise, the message is transferred. If receiving a message having a FALSE flag while the vehicle is within the zone of the Information Trap Line, the transfer processing unit 126 changes the flag to TRUE and executes processing for transferring the message.

The above mentioned antenna 138, the receiving unit 134, and the message receiving processing unit 120 correspond to message receiving means. The duration determination unit 122 corresponds to duration determination means. The transfer processing unit 126, the message transmitting processing unit 118, the transmitting unit 132, and the antenna 138 correspond to message transferring means. The application processing unit 116 corresponds to application processing means. The zone determination unit 124 corresponds to zone determination means.

The valid duration setting unit 114 corresponds to valid duration setting means. The zone setting units 112 and 202 correspond to zone setting means. The message transmitting processing unit 118, the transmitting unit 132, and the antenna 138 correspond to message transmitting means.

The inter-vehicle network system of this embodiment has such a configuration. Next, the system's operation is explained.

FIG. 5 to FIG. 11 show the outline of setting a zone for the Information Trap Line, which is processed by the zone setting unit 112 in the terminal control unit 110 or the zone setting unit 202 in the navigation device 200.

Figure 5:
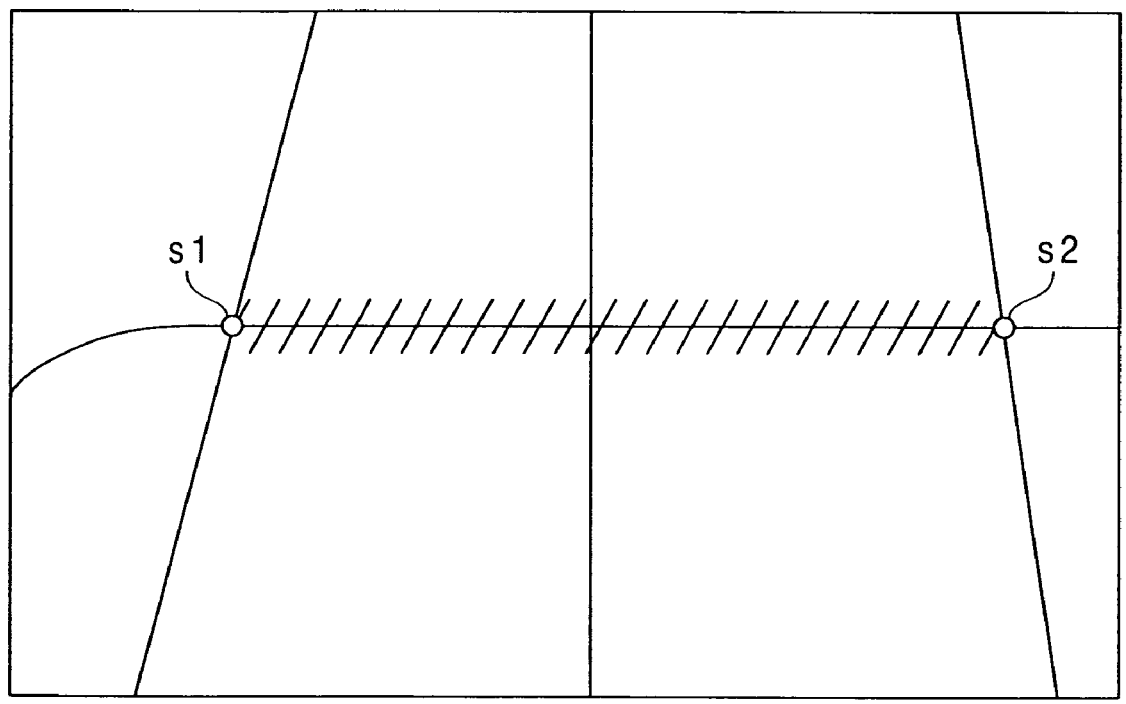
FIG. 5 is a schematic diagram of setting a zone of the Information Trap Line executed by the zone setting unit.

FIG. 5 illustrates a method for specifying two intersections s1 and s2 on the map image using an operation unit of the navigation device 200 (not shown). The range between the intersections s1 and s2 along the road (hatched range) is set as the zone of the Information Trap Line. The zone setting unit 202 in the navigation device 200 performs this setting.

Figure 6:
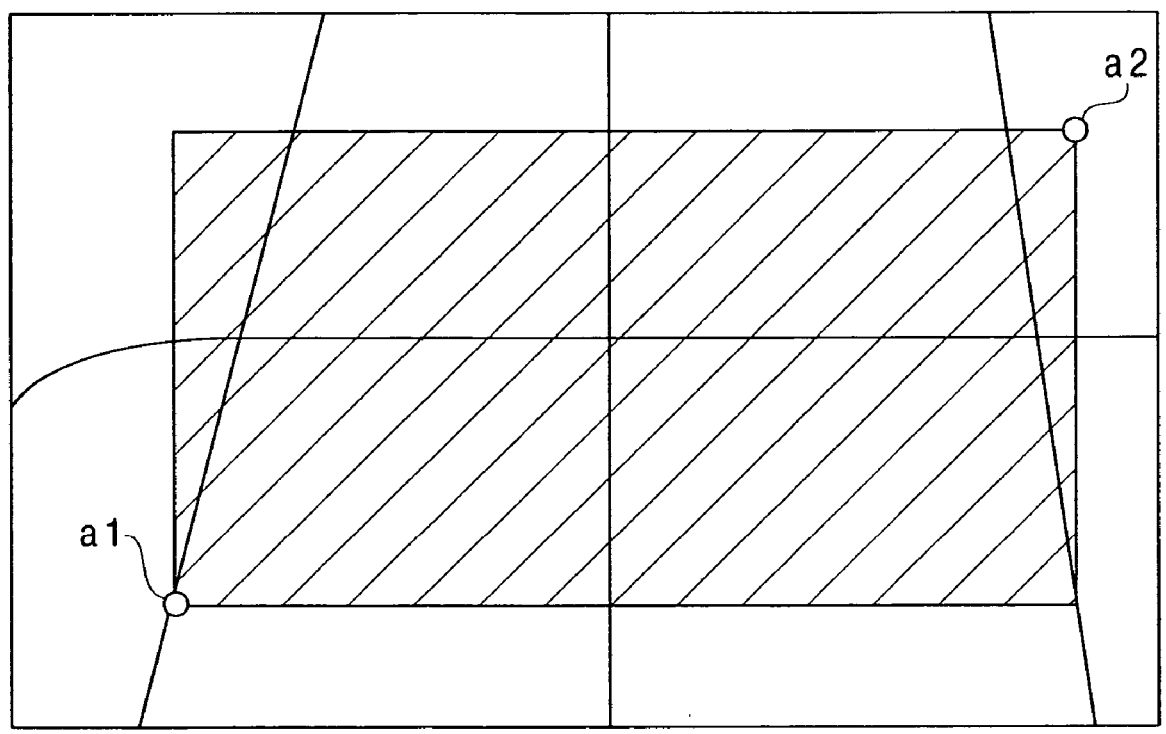
FIG. 6 is another schematic diagram of setting a zone of the Information Trap Line executed by the zone setting unit.

FIG. 6 illustrates a method for specifying any two points a1 and a2 in a map image using the operation unit of the navigation device 200. An oblong area having the two points a1 and a2 at the ends of the diagonal line (hatched range) is set as the zone of the Information Trap Line. The zone setting unit 202 of the navigation device 200 performs this setting.

Figure 7:
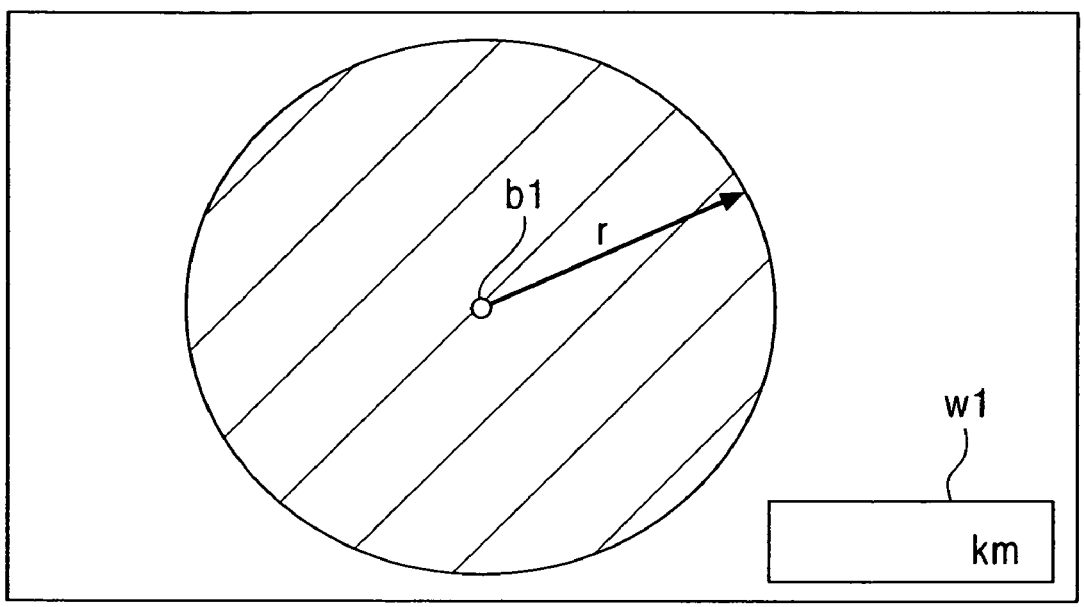
FIG. 7 is another schematic diagram of setting a zone of the Information Trap Line executed by the zone setting unit.

FIG. 7 illustrates a method for specifying a single point b1 (the center of a circle) in the map image and entering a radius r using the operation unit of the navigation device 200. The radius r is directly entered in the input box w1 located in the map image using a numeric keyboard of the operation unit of the navigation device 200. A circular area specified by the center of the circle and the radius (hatched range) is set as the zone of the Information Trap Line. The zone setting unit 202 of the navigation device 200 performs this setting.

Figure 8:
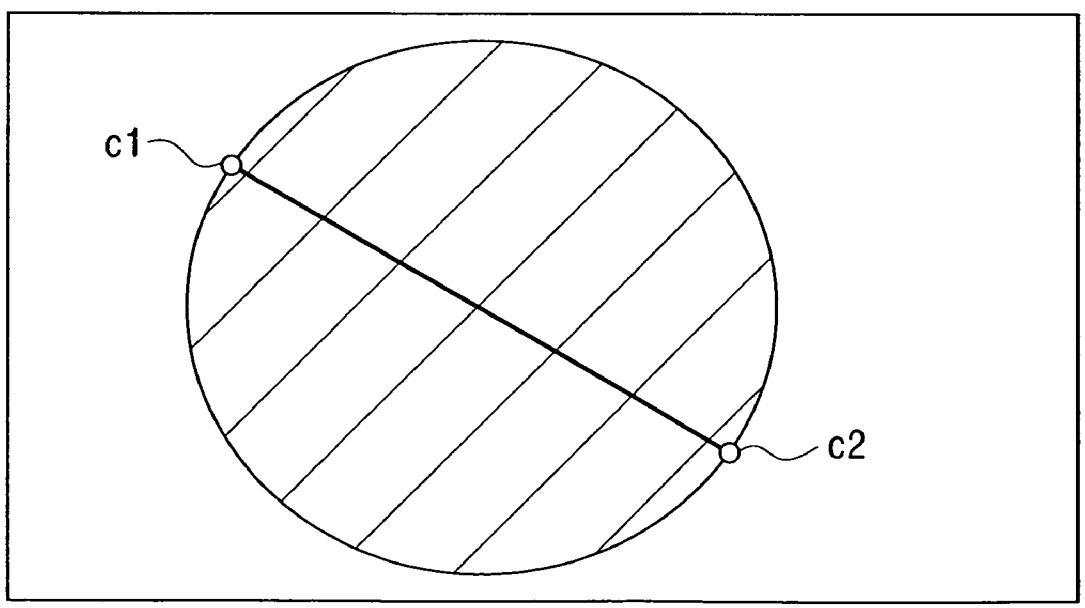
FIG. 8 is another schematic diagram of setting a zone of the Information Trap Line executed by the zone setting unit.

FIG. 8 illustrates a method for specifying any two points c1 and c2 on a map image using the operating unit of the navigation device 200. A circular area with a diameter specifying c1 and c2 at the diameter's ends (hatched range) is set as the zone of the Information Trap Line. The setting is performed by the zone setting unit 202 of the navigation device 200.

Figure 9:
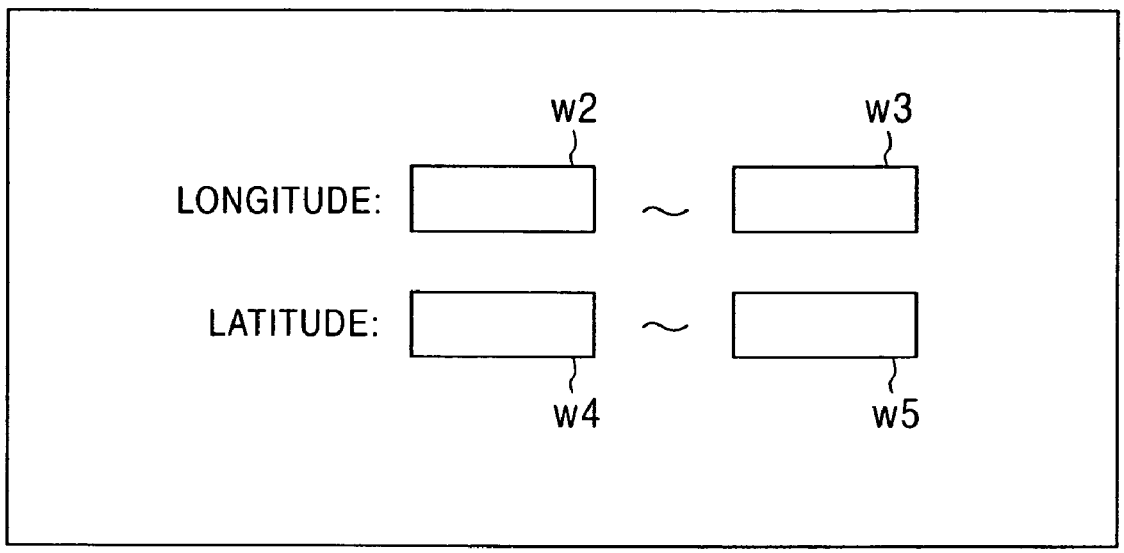
FIG. 9 is another schematic diagram of setting a zone of the Information Trap Line executed by the zone setting unit.

FIG. 9 illustrates a method for directly specifying ranges of latitude and longitude of any oblong area using the operating unit 144 of the in-vehicle terminal 100. Values of the latitude and the longitude are directly entered in the boxes w2 to w5 to specify them. The setting is performed by the zone setting unit 112 of the terminal control unit 110 in the in-vehicle terminal 100.

Figure 10:
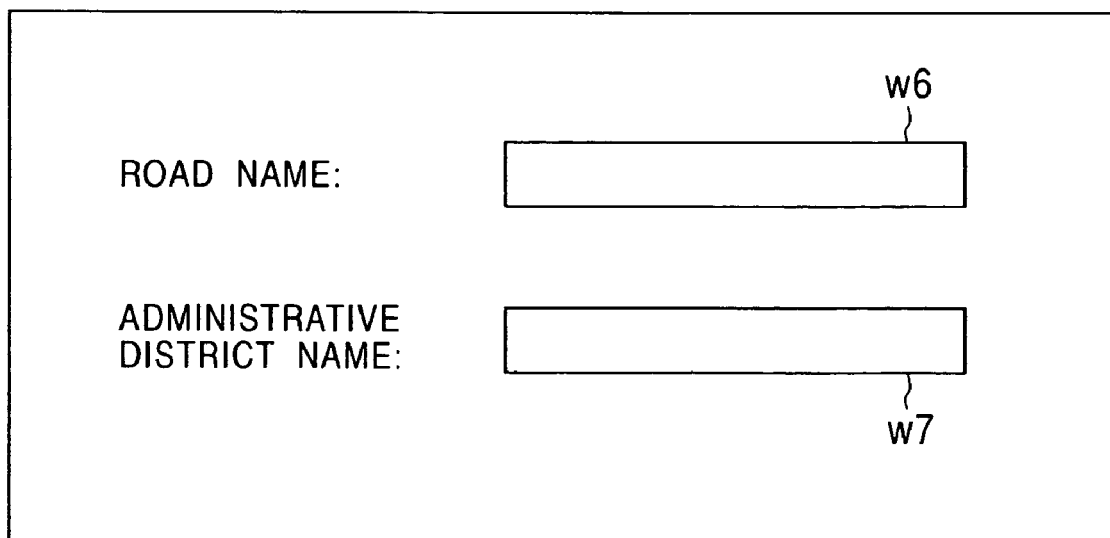
FIG. 10 is another schematic diagram of setting a zone of the Information Trap Line executed by the zone setting unit.

FIG. 10 illustrates a method for directly specifying a road name or an administrative district name using the operating unit 144 of the in-vehicle terminal 100. Strings of characters of road names, etc. are typed directly into the boxes w6 and w7 to specify them. The road identified by the name or an area identified by the administrative district name is set as the zone of the Information Trap Line. The setting is performed by the zone setting unit 112 of the terminal control unit 110 in the in-vehicle terminal 100.

Figure 11:
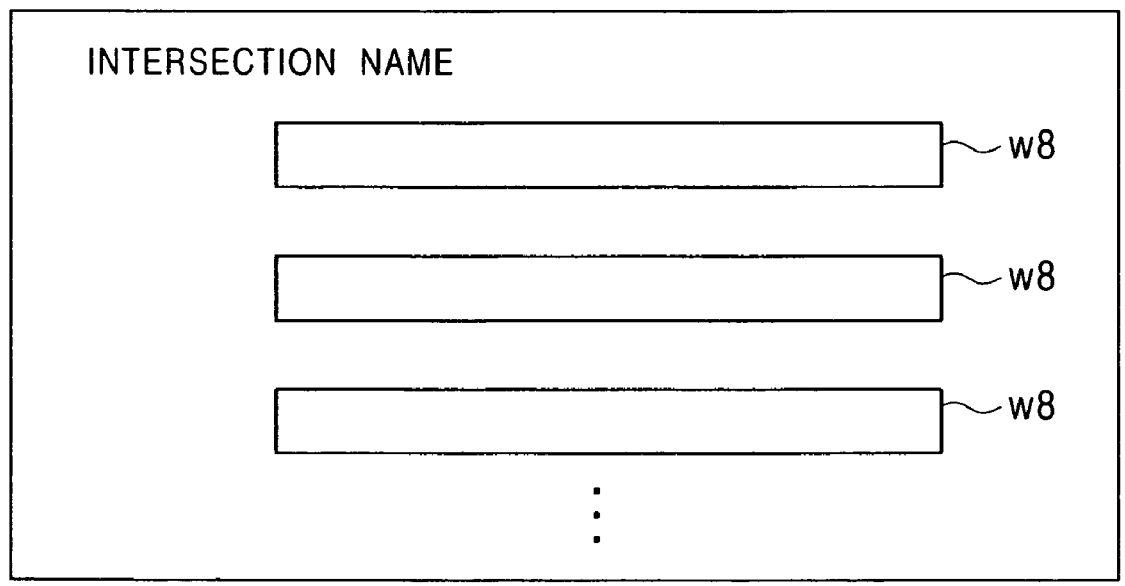
FIG. 11 is another schematic diagram of setting a zone of the Information Trap Line executed by the zone setting unit.

FIG. 11 illustrates a method for directly specifying a plurality of intersection names using the operating unit 144 of the in-vehicle terminal 100. Strings of characters of the intersection names are typed directly into a plurality of boxes w8 to specify them. A range between the intersections identified with the plurality of intersection names along the road is set as the zone of the Information Trap Line.

Figure 12:
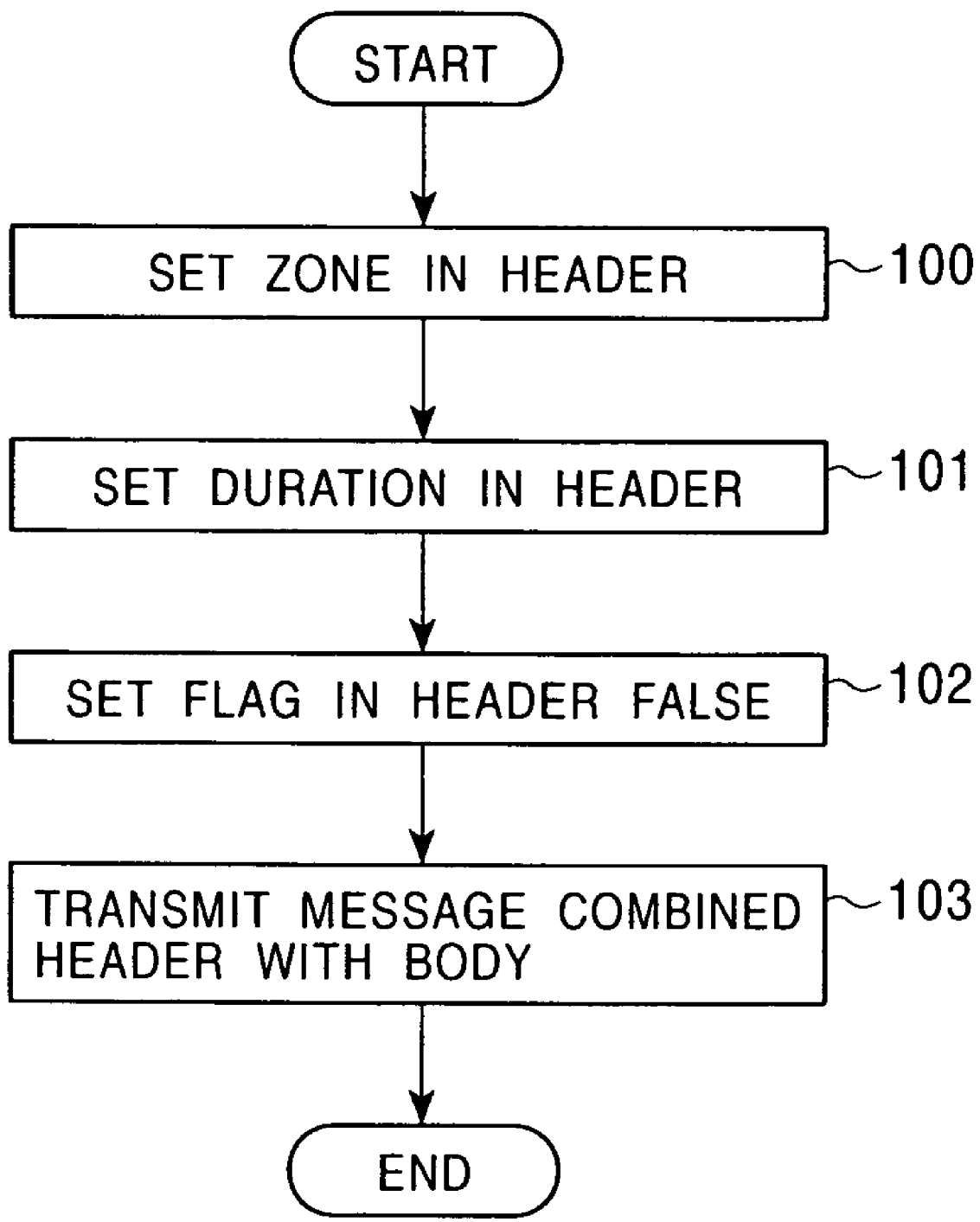
FIG. 12 is a flowchart showing the operation of an in-vehicle terminal as a message source.

FIG. 12 is a flowchart showing the general operation of the in-vehicle terminal 100 when functioning as a message source. First the zone setting unit 112 in the terminal control unit 110 sets the zone of the Information Trap Line in the message header (Step 100). As described above, in the case of setting the zone by the map display function of the navigation device 200, zone setting by the zone setting unit 202 in the navigation device 200 is requested. The valid duration setting unit 114 sets a valid duration of the Information Trap Line in the message header (Step 101).

The message transmitting processing unit 118 sets to FALSE a flag that indicates whether or not the Information Trap Line in the header is formed (Step 102).

After completion of setting the items of the header in this way, the header is combined with the body received from the application processing unit 116 to form a message. The message transmitting processing unit 118 then transmits the message (Step 103).

Figure 13:
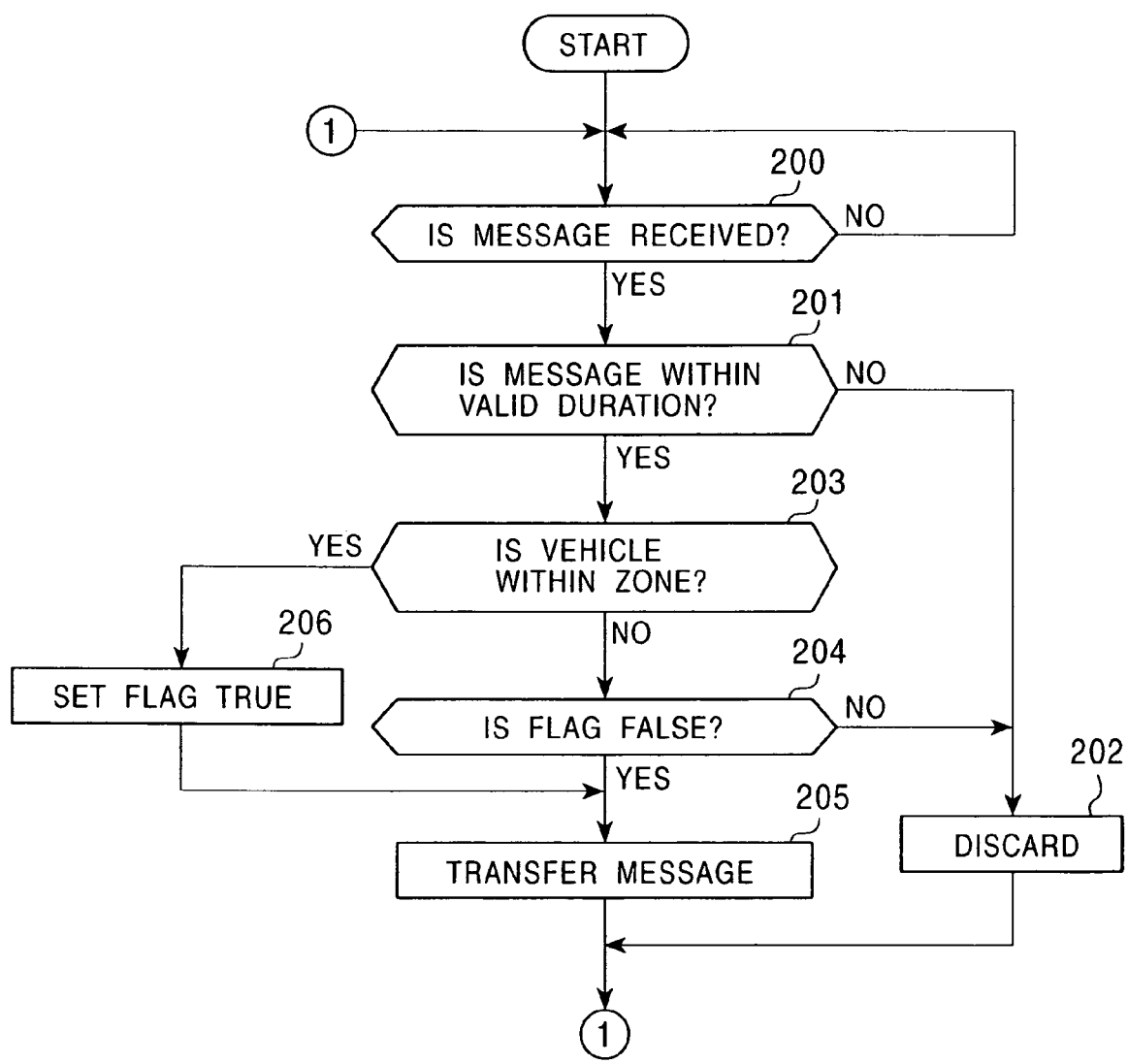
FIG. 13 is a flowchart showing the operation of an in-vehicle terminal as a receiver of a message transmitted from another vehicle.

FIG. 13 is a flowchart showing the general operation of the in-vehicle terminal 100 when receiving a message transmitted from another vehicle. The message receiving processing unit 120 determines whether or not a message transmitted from another vehicle is received (Step 200). Until it receives a message, the message receiving processing unit 120 gives a negative determination and repeats the same determination. When it receives a message, the message receiving processing unit 120 gives a positive determination in Step 200. Then, the duration determination unit 122 extracts a valid duration of the Information Trap Line included in the message header to determine whether or not the current time is within the valid duration (Step 201). If the time is beyond the valid duration, the duration determination unit 122 gives a negative determination. In this case, the transfer processing unit 126 discards the message received by the message receiving processing unit 120 (Step 202).

If the message is within the valid duration, Step 201 gives a positive determination. Then, the zone determination unit 124 determines whether the current position of the vehicle equipped with this message processing device is within the zone of the Information Trap Line included in the message header (Step 203). If the vehicle is out of the zone, the zone determination unit 124 gives a negative determination. In the case that the zone of the Information Trap Line is set using road names or the like, it is difficult to determine Step 203 by the zone determination unit 124 in the terminal control unit 110 alone. In this case, preferably, another zone determination unit (not shown) is installed in the navigation device 200. Then, to get the determination result, the zone determination unit 124 requests determination by the zone setting unit in the navigation device 200 using its map display function.

The transfer processing unit 126 determines whether or not a flag included in the header is FALSE (Step 204). If the flag is FALSE, the unit 126 gives a positive determination and transfers the message to other vehicles without changing the header content (Step 205). Meanwhile, if the flag is TRUE, Step 204 gives a negative determination, discarding the message (Step 202).

If the current position of the vehicle is within the Information Trap Line included in the message header, Step 203 gives a positive determination. Then, the transfer processing unit 126 sets the flag in the header to TRUE (Step 206) and executes processing for transferring the message to other vehicles (Step 205).

Taking the inter-vehicle network system shown in FIG. 1 as an example, the case of transmitting a message from a vehicle f as a message source is described. The flag in the header of the message transmitted from the vehicle f is set FALSE (Step 102 in FIG. 12). Upon receiving the message, vehicles c and d which are out of the zone of the Information Trap Line transfer the message with the FALSE flag. On the other hand, vehicles a and b transfer the message after changing the flag to TRUE. After that, if the message from the vehicle b is received by a vehicle e, which is outside of the zone of the Information Trap Line, the message is discarded without being transferred because the flag of the message header is TRUE.

In this way, the message transmitted from the vehicle f out of the zone of the Information Trap Line continues to be transferred and the flag in the message header remains FALSE until reaching a vehicle within the zone. Once the message is received by the vehicle a or b which are within the zone, the flag of the message header is changed to TRUE and transferred. Therefore, vehicles out of the zone easily determine whether a message is being transferred for a vehicle within the zone or is retransmitted after reaching a vehicle within the zone. As a result, unnecessary messages can be discarded.

Next, an example of sending and receiving information between vehicles using the above-mentioned inter-vehicle network system is explained.

(1) Requesting other vehicles to search for a target vehicle in a specified zone The terminal control unit 110 in a vehicle requesting a search for the target vehicle specifies a zone and a valid duration for a header of a message, combines the header with the body that includes a content which requests a report back when the target vehicle is found, and then transmits the message.

The transmitted message is transferred among a plurality of vehicles.

Upon finding the target vehicle, the terminal control units 110 in vehicles driving within the zone of the Information Trap Line report to the requesting vehicle. Including the telephone number of a mobile phone 146 installed in the requesting vehicle in the message body enables the report to be sent to the mobile phone 146. As a method for finding a target vehicle, when receiving information of another vehicle in inter-vehicle communication, it may be determined whether or not the other vehicle matches the target vehicle. Alternatively, the reporting vehicle may be equipped with a camera that analyzes an image to find the target vehicle.

(2) Transmitting information obtained in a specified zone to other vehicles driving in the same zone (to be used like a message board)

The terminal control unit 110 in the requesting vehicle specifies a zone and a valid duration for a header of a message, combines the header with the body that includes the obtained information and a notification to transmit the information to be received, and then transmits the message.

By examining the message body, the terminal control unit 110 in a vehicle in the zone of the Information Trap Line enables the information transmitted by the requesting vehicle to be obtained. Once transmitted outside of the zone of the Information Trap Line, the message is discarded without being transferred, thereby preventing the area in which the message is transferred from unnecessarily spreading.

In this way, since the message header transferred includes the zone of the Information Trap Line and the valid duration, simply transmitting and receiving the message enables a dedicated network corresponding to the Information Trap Line to be formed, retained, and destroyed without using special equipment, such as a server.

The above embodiments are given by way of example only. Changes in form and detail may be made by one skilled in the art without departing from the scope of the invention as defined by the appended claims. The embodiments describe an inter-vehicle network; however, a part or all of the terminals may be installed somewhere other than in vehicles.

In the above mentioned embodiments, having a flag in a message header allows a message transmitted from outside of the zone of the Information Trap Line to be efficiently transferred within the zone. However, if a message source in-vehicle terminal 100 is always disposed in the zone, the flag may be omitted.

What is claimed is:

1. A message processing device in an inter-vehicle network of a plurality of message processing devices located in respective vehicles for transferring messages among the vehicles, each message processing device comprising:

a message receiving unit for receiving a message having a body including data to be transmitted and a header including a valid time duration, a valid geographical zone, and a flag, the flag being set when the message reaches the valid geographical zone;

a duration determination unit for determining whether or not the message is within the valid time duration when the message receiving unit receives the message;

a zone determination unit for determining whether or not the message processing device is located within the valid geographical zone when the message receiving unit receives the message;

a message transferring unit for transferring the message to at least one other message processing device when the duration determination unit and the zone determination unit give positive results, or when the duration determination unit gives a positive result, the zone determination unit gives a negative result, and the flag is not set; and an application processing unit for reading out data included in the body to execute predetermined processing based on the data when the duration determination unit and zone determination unit gives positive results, wherein the predetermined processing is other than transferring the message.

2. A message processing device according to claim 1, further comprising:

a position detecting unit for detecting a current location of the message processing device, wherein the determination of the zone determination unit is based on a detection result of the position detecting unit.

3. A message processing device in a network of message processing devices, each message processing device comprising:

a message receiving unit for receiving a message having a body including data to be transmitted and a header including information specifying a valid geographical zones and a flag, the flag being set when the message reaches the valid geographical zone;

a zone determination unit for determining whether or not the message processing device is located within the valid geographical zone when the message receiving unit receives the message;

a message transferring unit for transferring the message to at least one other message processing device when the zone determination unit gives a positive result, or when the zone determination unit gives a negative result and the flag is not set; and an application processing unit for reading out data included in the body to execute predetermined processing based on the data when the zone determination unit gives a positive result, wherein the predetermined processing is other than transferring the message.

4. A message processing device according to claim 3, further comprising:

a position detecting unit for detecting a current location of the message processing device, wherein the determination of the zone determination unit is based on a detection result by the position detecting unit.

5. A message processing device in a network of message processing devices, each message processing device comprising:

a valid duration setting unit for setting a valid time duration for a message;

a zone setting unit for setting a valid geographical zone;

an application processing unit for generating data to be transmitted; and a message transmitting unit for transmitting a message having a body including the data generated by the application processing unit and a header including the valid time duration set by the valid duration setting unit, the valid geographical zone set by the zone setting unit, and a flag, the flag being set when the message reaches the valid geographical zone;

whereby the valid time duration and valid geographical zone are checked by a message processing device receiving the message to determine whether to transfer the message to at least one other message processing device and execute predetermined processing based on the data in the message body, wherein the predetermined processing is other than transferring the message;

the message being transferred when the message is received within the valid time duration and within the valid geographical zone, or when the message is received within the valid time duration and is not received within the valid geographical zone and the flag is not set, and the predetermined processing being executed when the message is received within the valid time duration and within the valid geographical zone.

6. The message processing device of claim 5, wherein the zone setting unit sets a range between intersections along a road as the valid geographical zone when a plurality of the intersections are specified.

7. The message processing device of claim 5, wherein the zone setting unit sets a range of a road specified by a road name as the valid geographical zone when the road name is specified.

8. The message processing device of claim 5, wherein the zone setting unit sets a range between intersections along a road as the valid geographical zone when a plurality of the intersections are specified.

9. The message processing device of claim 5, wherein the zone setting unit sets a range along a road specified by a mad name as the valid geographical zone when the road name is specified.

10. A message processing device in an inter-vehicle network of a plurality of message processing devices located in respective vehicles for transferring messages among the vehicles, each message processing device comprising:

a zone setting unit for setting a valid geographical zone for a message;

an application processing unit for generating data to be transmitted; and a message transmitting unit for transmitting a message having a body including the data generated by the application processing unit and a header including information specifying the valid geographical zone set by the zone setting unit a and a flag, the flag being set when the message reaches the valid geographical zone;

whereby the valid geographical zone is checked by a message processing device receiving the message to determine whether to transfer the message to at least one other message processing device and execute predetermined processing based on the data in the message body, wherein the predetermined processing is other than transferring the message;

the message being transferred when the message is received within the valid geographical zone, or when the message is not received within the valid geographical zone and the flag is not set, and the predetermined processing being executed when the message is received within the valid geographical zone.

11. The message processing unit of claim 10, wherein the zone setting unit sets a range between intersections along a road as the valid geographical zone when a plurality of the intersections are specified.

12. The message processing unit of claim 10, wherein the zone setting unit sets a range of a road specified by the road name as the valid geographical zone when the road name is specified.

13. The message processing device in claim 10, wherein the zone setting unit sets a geographical range specified by an administrative district name as the valid geographical zone when the administrative district name is specified.

14. The message processing device in claim 10, wherein the zone setting unit sets a geographical range enclosed by a plurality of points as the valid geographical zone when a plurality of the points are specified.

15. The message processing device according to claim 10, further comprising:
a navigation device for displaying a map,
wherein the zone setting unit sets the valid geographical zone through a map display screen displayed by the navigation device.

* * * * *